United States Patent [19]

Lee

[11] Patent Number: 5,676,743

[45] Date of Patent: Oct. 14, 1997

[54] INK FORMULATIONS CONTAINING CYCLOPARAFFINS

[75] Inventor: Robert Wen Lee, Houston, Tex.

[73] Assignee: Shell Oil Company, Houston, Tex.

[21] Appl. No.: 575,376

[22] Filed: Dec. 20, 1995

[51] Int. Cl.$^6$ .................................... C09D 11/02
[52] U.S. Cl. ................. 106/20 R; 106/30 R; 106/32
[58] Field of Search .................. 106/20 R, 30 R, 106/32

[56] References Cited

U.S. PATENT DOCUMENTS

| | | | |
|---|---|---|---|
| 3,864,181 | 2/1975 | Wolinski et al. | 156/79 |
| 4,001,035 | 1/1977 | Ito et al. | 106/500 |
| 4,130,518 | 12/1978 | Rybny et al. | 260/22 CB |
| 4,157,266 | 6/1979 | Hauxwell et al. | 106/23 H |
| 4,289,678 | 9/1981 | Calder et al. | 106/20 R |
| 4,346,183 | 8/1982 | Hyde | 523/200 |
| 4,400,460 | 8/1983 | Fickes et al. | 430/306 |
| 4,401,470 | 8/1983 | Bridger | 106/20 R |
| 4,609,729 | 9/1986 | Garner | 106/191 |
| 4,653,082 | 3/1987 | Frilette | 106/23 R |
| 4,767,835 | 8/1988 | Janusz | 527/600 |
| 5,389,130 | 2/1995 | Batlaw et al. | 106/20 R |

*Primary Examiner*—Helene Klemanski
*Attorney, Agent, or Firm*—Dennis V. Carmen

[57] ABSTRACT

Ink formulations comprising a solvent that is predominantly a cycloparaffin solvent. The ink formulations include conventional resins and pigments which are soluble in the cycloparaffin. The absence of aromatic solvents in the ink formulations is preferred. Ink formulations have been prepared that compare favorably to conventional ink formulations when used in gravure printing.

13 Claims, No Drawings

INK FORMULATIONS CONTAINING CYCLOPARAFFINS

FIELD OF THE INVENTION

The present invention relates to solvents useful for making inks. More specifically, the invention relates to ink formulations for color printing.

BACKGROUND OF THE INVENTION

Ink formulations for color printing, such as gravure printing, conventionally contain aromatic solvents to function as a carrier for binders, pigments, and other additives. Non-aromatic solvents have been blended with aromatic solvents to reduce the adverse environmental and health effects associated with use of aromatic solvents. However, non-aromatic solvents have been inferior to aromatic solvents in ink formulations with regard to print quality and resin solubility and are not used as a major component of the conventional ink formulations.

Gravure printing is widely used to make printed publications such as catalogs and magazines. The gravure process involves repeated application of inks of different colors, typically magenta, cyan, yellow, and black. Toluene is typically used as the solvent because it gives the ink formulation the appropriate viscosity without the need of using viscosity modifiers and has excellent evaporation properties.

Oxygenated solvents such as ketones, esters, and alcohols have been used to formulate inks having reduced health and environmental impacts. However, the oxygenated solvents are very expensive and impractical for commercial practices.

There remains a need for affordable ink formulations having reduced amounts of aromatic solvents, preferably ink formulations having no aromatic solvents.

SUMMARY OF THE INVENTION

The present invention is ink formulations comprising a solvent that is predominantly a cycloparaffin solvent. The ink formulations include conventional resins and pigments which are soluble in the cycloparaffin. The absence of aromatic solvents in the ink formulations is preferred. Ink formulations have been prepared that compare favorably to conventional ink formulations when used in gravure printing.

DETAILED DESCRIPTION OF THE INVENTION

Ink formulations having excellent print quality and superior color strength to conventional formulations have been prepared by combining cylcoparaffin solvents with conventional ink components that are soluble in the cycloparaffins. Useful ink formulations in accordance with this invention, comprise from 40% to 70% by weight of a solvent which predominantly comprises one or more cycloparaffin solvents, from 20% to 60% by weight of a resin that is soluble in the cycloparaffinic solvents, and from 5% to 25% by weight of additives. Formulations containing the lower amounts of solvents are generally diluted prior to use.

The cycloparaffin solvents have from 6 to 15 carbon atoms per molecule, preferably from 7 to 10 carbon atoms per molecule. Cycloparaffins that are available for use in ink formulations include cyclohexane, methyl cyclohexanes, ethyl cyclohexanes, methyl ethyl cyclohexanes, trimethyl cyclohexanes, n-propyl cyclohexanes, iso-propyl cyclohexanes, n-butyl cyclohexanes, iso-butyl cyclohexanes. The cycloparaffin solvents are usually blends of cycloparaffins having the same or nearly the same number of carbon atoms since the boiling points and evaporation rates tend to vary by the number of carbon atoms.

The cycloparaffin solvents can be used alone or in combination with other solvents to make the ink formulations of this invention. Aliphatic solvents having the same or nearly the same number of carbon atoms as the cycloparaffins can comprise from 0% to 25% by weight of the solvent to reduce cost without significantly altering the ink formulation. The cycloparaffins can also be mixed with aromatic solvents such as toluene if the total solvent comprises a predominant amount of the cycloparaffin solvents. However, mixing with aromatic solvents would make solvent recycling more difficult.

The amount of solvents used in the ink formulations just prior to printing depends on the optimum ink viscosity for the printing equipment as well as drying time and solubility of the other components. Gravure printing preferably uses ink having a viscosity of about 10 cps or less which is readily achieved with excellent drying time and solubility of the other components.

The resins used in the ink formulations of the present invention must be soluble in cycloparaffins. Calcium/zinc rosinates are readily available for making conventional inks for gravure printing and have the best solubility in cycloparaffins of the various resins that have been tested. Excellent results were obtained using Ca/Zn rosinates supplied by Resinall. The rosinates, commercially designated as R-127 and R-153, readily dissolved in the cycloparaffins at 90° C. with stirring at solid contents of about 35% by weight. Formulations containing the R-153 rosinate provided better pigment wetting and better gloss than the formulations containing the R-127 rosinate. However, the former rosinate is substantially more expensive than the latter rosinate and is not frequently used in gravure printing. Polyamide resins such as AZAMIDE resins available from Shell Chemical Company also readily dissolved in the cycloparaffin solvents and would be useful for flexographic printing. Modified rosin esters, also widely used in printing ink formulations, were found to be less soluble under the same conditions and did not result in useful ink formulations at 35% solids.

Additives typically used in ink formulations include pigments, fillers, and waxes. All ink formulations contain pigments. Fillers, waxes, surfactants, and other modifying compounds, such as modifying resins, are used to reduce cost or improve specific properties of the ink formulation. The most common filler is clay. Such additives should have the same utility in the present ink formulations. However, certain additives may be less soluble in cycloparaffins than in toluene and should be replaced with more soluble alternatives.

The ink formulations of the present invention are best prepared by heating the solvent to at least 90° C. and adding the other components with stirring. Further grinding of the dispersed ink is preferred to reduce the particle size of dispersed pigments to less than one micron.

The ink formulations of the present invention are best suited for gravure printing.

DETAILED DESCRIPTION OF PREFERRED EMBODIMENTS

Preferred ink formulations in accordance with this invention, comprise from 50% to 60% by weight of a solvent which comprises at least 80% by weight of cycloparaffin solvents having from 7 to 10 carbon atoms per molecule, from 30% to 45% by weight of a Ca/Zn rosinate, and from 5% to 15% by weight of pigments and other additives.

The preferred cycloparaffin solvents that are available for use in ink formulations include methyl cyclohexanes, ethyl cyclohexanes, and methyl ethyl cyclohexanes. Blends of these cycloparaffin solvents are useful in adjusting the solvent properties as shown in the examples below.

The preferred resin used in the ink formulations of the present invention is R-127, a Ca/Zn rosinate which is commercially available from Resinall. The best ink formulations prepared with this resin are described in the examples below in comparison to the same formulation containing toluene instead of cycloparaffins.

The following examples describe preferred embodiments and are not intended to limit the invention to those embodiments even if portions of the following descriptions are used as claim limitations.

EXAMPLES

Two cycloparaffin solvents having boiling points higher and lower than toluene were selected to prepare a cycloparaffin solvent blend having the same drying time as toluene as well cycloparaffin solvent blends that dry 20% faster or slower than toluene. The first cycloparaffin solvent ($S_1$), which has a boiling range from 208.4° to 219.0° F., contained at least 80% by weight of methyl cyclohexane and less than 20% by weight of $C_7$ aliphatics. The second cycloparaffin solvent ($S_2$), which has a boiling range from 280° to 330° F., contained at least 99% by weight of $C_9$ and $C_{10}$ cycloparaffins, predominantly trimethyl cyclohexanes and methyl ethyl cyclohexanes.

The cycloparaffin solvents, $S_1$ and $S_2$, were blended to form three cycloparaffin solvent blends, $SB_1$, $SB_2$, and $SB_3$. $SB_1$ contains 81.5 wt % of $S_1$ and 18.5 wt % of $S_2$ and has about the same drying time as toluene. $SB_2$ contains 73.0 wt % of $S_1$ and 27.0 wt % of $S_2$ and has a drying time that is about 20% slower than toluene. $SB_3$ contains 89.5 wt % of $S_1$ and 10.5 wt % of $S_2$ and has a drying time that is about 20% faster than toluene.

Example 1

Solvent blends $SB_1$, $SB_2$, and $SB_3$ and toluene were used to dissolve R-127 and R-153 rosinates (without pigments) for comparison of the gloss and color values of prints prepared by a Moser gravure proof press. Formulations containing the R-127 rosinate contained 63% by weight of the solvent and 37% by weight of the rosinate to achieve a viscosity of about 10 cps. Formulations containing the R-153 rosinate contained 55% by weight of the solvent and 45% by weight of the rosinate to achieve a viscosity of about 10 cps.

The unpigmented ink formulations were printed on #5 Light Weight Coated paper using the Moser gravure proof press. Gloss at 60 degrees was measured for each print with a Gradnet Glossmeter. Color values (L, a, b) for each print were measured with a Gertag SPM 60 unit. The toluene ink formulations had similar gloss to the cycloparaffin in formulations as shown in Table 1. The toluene ink formulations were also more yellow than the cycloparaffin ink formulations with reference to the yellow/blue values (b) shown in Table 1. The lightness value (L) and the red value (a) for the solvents were similar. This data indicates that the cycloparaffin solvents result in similar quality prints, if not better, in comparison to toluene.

TABLE 1

| Gloss and Color Values of Moser Prints | | | | |
|---|---|---|---|---|
| | $SB_1$ | $SB_2$ | $SB_3$ | Toluene |
| R-127 Rosinate (37% solids) | | | | |
| Gloss | 36 | 36 | 37 | 35 |
| L | 81.08 | 81.07 | 81.49 | 80.00 |
| a | −2.84 | −2.81 | −2.86 | −3.03 |
| b | 6.50 | 6.36 | 6.52 | 7.99 |
| R-153 Rosinate (45% solids) | | | | |
| Gloss | 35 | 41 | 38 | 37 |
| L | 81.05 | 81.18 | 81.14 | 79.99 |
| a | −2.51 | −2.39 | −2.36 | −2.54 |
| b | 5.22 | 4.85 | 4.42 | 5.87 |

Example 2

The cycloparaffin solvent blends of Example 1 and toluene were used to prepare both blue and yellow ink formulations. The inks were printed on three different quality papers using a 4-color Cerutti gravure press. The prints were tested for gloss and color values as described in Example 1. The prints were further tested for color density as measured with an X-Rite 408 densitometer.

Solvent blends $SB_1$, $SB_2$, and $SB_3$ and toluene were used to dissolve R-127 rosinates along with yellow or blue pigments. The yellow pigment was Hueco Yellow PY 101402-44 (PY 14, AAOT) obtained from Heubach. The blue pigment was Hueco Blue PB 501531-05 (PB 15.3, Phthalo Blue) obtained from Huebach. Each ink formulation contained 54% by weight of the solvent, 36% by weight of the R-127 rosinate, and 10% by weight of the pigment.

The solvents and pigments were blended to wet the pigments and then blended in a Cowles type disperser for five minutes followed by slow addition of the R-127 resin with continued stirring for 10 minutes. Heat was not used to form the inks and toluene dissolved the resin at a faster rate. The dispersed inks were then ground on an LMZ Netzsch mill at speeds of 1800–2800 rpm at 2 gallons/minute. The yellow inks were ground for 30 minutes at 45°–50° C. and the blue inks for 40 minutes at 70° C. The pigments in the finished inks were less than 1 micron particle size.

The viscosity of each ink formulation was reduced to about 10 cps prior to printing by addition of the solvent used to make the ink. The final solids content of the inks are shown in Table 2 for each ink formulation.

The ink formulations were printed on #3 INFLUENCE paper (Very High Quality), #5 ROTOCOTE paper (High Quality), and SCA (supercalendered uncoated) paper (Good Quality) using the 4-color Cerutti gravure press. The first station was yellow ink, the second station was open, the third station was blue ink, and the fourth station was open. Blue and yellow inks were used for the printing test since the corresponding pigments are the least compatible with most solvents. A 23 in. web was used with speeds of 500 feet/minute for single color printing and 700 feet/minute for trapping blue over yellow. Electrostatic assist (ESA) was used to give optimum quality printing. When trapping, a small section was printed without ESA for comparison of quality.

After loading the corresponding blue and yellow inks in the gravure press, the sequence of printing was trapped without ESA, trapped with ESA, yellow with ESA, and blue with ESA. The sequence was run for each type of paper. Although the ink sumps and pans were covered, solvents had to be added after each change of paper to restore the viscosity to about 10 cps. Typical toluene additions were about 1 liter whereas typical cycloparaffin additions were about ½ liter.

In comparison to the toluene control: ink formulations from $SB_1$ appeared brighter and cleaner on SCA paper, about the same on #5 paper, and too fast drying on paper #3; ink formulations from $SB_2$ appeared cleaner and brighter on SCA paper, and about the same on #3 or #5 paper; and ink formulations from $SB_3$ appeared about the same on SCA paper, and drying too fast on #3 or #5 paper.

The gloss, color density, and color values for the print samples are shown in Table 2. The cycloparaffin inks had substantially higher color densities for the blue inks than the toluene ink which indicates that less blue pigments could be used at lower cost. Higher color densities for yellow inks containing the cycloparaffins were also noted and should also allow use of less yellow pigments.

The cycloparaffin inks had a slight gloss advantage for all of the yellow inks on all types of paper. The cycloparaffin inks also had a slight gloss advantage for all blue inks on #3 and SCA papers, not on #5 paper. All of the cycloparaffin inks were similar to the corresponding toluene inks with respect to color values.

The print transfer, lay (spreading), and smoothness for the cycloparaffin inks was routinely better than for the toluene inks.

TABLE 2

Properties of Blue/Yellow Prints

|  | $SB_1$ | $SB_2$ | $SB_3$ | Toluene |
|---|---|---|---|---|
| #3 Paper, Yellow | | | | |
| Solids, wt % | 35 | 36 | 40 | 35 |
| Color Density | 1.13 | 1.19 | 1.09 | 1.00 |
| Gloss | 46.0 | 49.2 | 45.5 | 33.0 |
| L | 83.4 | 82.5 | 82.4 | 83.4 |
| a | −4.4 | −4.0 | −4.0 | −2.7 |
| b | 53.6 | 53.3 | 52.2 | 50.4 |
| #5 Paper, Yellow | | | | |
| Solids, wt % | 35 | 36 | 40 | 35 |
| Color Density | 1.14 | 1.06 | 1.15 | 1.06 |
| Gloss | 25.0 | 22.0 | 26.0 | 22.0 |
| L | 78.1 | 77.5 | 77.2 | 77.2 |
| a | −3.0 | −2.8 | −2.6 | 1.0 |
| b | 49.4 | 48.8 | 48.5 | 47.1 |
| SCA Paper, Yellow | | | | |
| Solids, wt % | 35 | 36 | 40 | 35 |
| Color Density | 1.05 | 1.04 | 1.04 | 0.88 |
| Gloss | 17.0 | 17.0 | 17.0 | 11.0 |
| L | 78.7 | 78.1 | 79.1 | 78.4 |
| a | −2.5 | −2.6 | −3.0 | 1.0 |
| b | 47.2 | 47.0 | 48.5 | 43.5 |
| #3 Paper, Blue | | | | |
| Solids, wt % | 33 | 33 | 33 | 34 |
| Color Density | 1.95 | 1.92 | 1.94 | 1.81 |
| Gloss | 50.0 | 49.5 | 47.5 | 46.5 |
| L | 44.0 | 44.2 | 43.4 | 43.6 |
| a | −26.5 | −26.6 | −25.8 | −25.7 |
| b | −46.3 | −44.2 | −46.5 | −45.2 |

TABLE 2-continued

Properties of Blue/Yellow Prints

|  | $SB_1$ | $SB_2$ | $SB_3$ | Toluene |
|---|---|---|---|---|
| #5 Paper, Blue | | | | |
| Solids, wt % | 33 | 33 | 33 | 34 |
| Color Density | 1.75 | 1.57 | 1.73 | 1.57 |
| Gloss | 25.0 | 30.6 | 23.3 | 30.6 |
| L | 42.4 | 42.6 | 42.4 | 43.0 |
| a | −26.1 | −26.8 | −26.1 | −25.7 |
| b | −39.5 | −38.8 | −37.4 | −36.3 |
| SCA Paper, Blue | | | | |
| Solids, wt % | 33 | 33 | 33 | 34 |
| Color Density | 1.45 | 1.52 | 1.52 | 1.22 |
| Gloss | 17.0 | 17.0 | 17.0 | 17.0 |
| L | 43.2 | 44.8 | 44.3 | 45.2 |
| a | −24.3 | −24.5 | −25.9 | −21.7 |
| b | −34.5 | −33.8 | −35.5 | −35.5 |

What is claimed is:

1. An ink formulation, comprising from 40% to 70% by weight of a solvent comprising at least 80% by weight of cycloparaffin solvents, from 20% to 60% by weight of a resin that is soluble in the solvents, and from 5% to 25% by weight of additives.

2. The ink formulation of claim 1, wherein the resin is a calcium/zinc rosinate.

3. The ink formulation of claim 1, wherein the cycloparaffin has from 7 to 10 carbon atoms per molecule.

4. The ink formulation of claim 1, wherein the cycloparaffin solvent comprises methyl cyclohexane.

5. The ink formulation of claim 1, wherein the formulation comprises from 50% to 60% by weight of the solvent.

6. The ink formulation of claim 1, wherein the formulation comprises from 30% to 45% by weight of a calcium/zinc rosinate.

7. The ink formulation of claim 1, wherein the solvent consists of cycloparaffins having from 7 to 10 carbon atoms per molecule.

8. The ink formulation of claim 1, wherein the solvent consists of methyl cyclohexane.

9. An ink formulation, comprising from 50% to 60% by weight of a solvent which comprises at least 80% by weight of cycloparaffin solvents having from 7 to 10 carbon atoms per molecule, from 30% to 45% by weight of a calcium/zinc rosinate, and from 5% to 15% by weight of additives.

10. The ink formulation of claim 9, wherein the cycloparaffin solvent comprises methyl cyclohexane.

11. The ink formulation of claim 9, wherein the solvent consists of methyl cyclohexane.

12. An improved ink formulation for gravure printing, the ink formulation comprising an aromatic solvent, a resin that is soluble in the solvent, and pigments, the improvement comprising replacing at least 80% by weight of the aromatic solvent with a cycloparaffin solvent.

13. The improved ink formulation of claim 12, wherein the solvent consists of cycloparaffins having from 7 to 10 carbon atoms per molecule.

* * * * *